Oct. 23, 1928.
H. H. HILL
1,688,966
NUT CRACKING MACHINE
Filed June 21, 1926     2 Sheets-Sheet 1
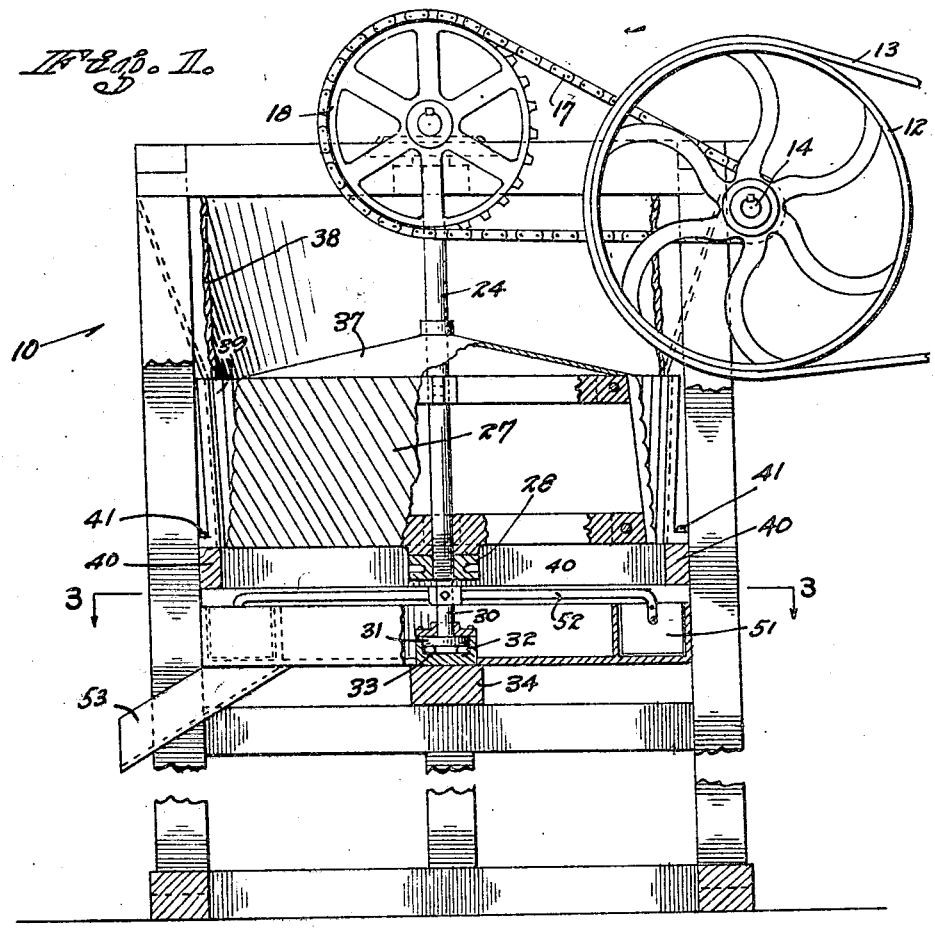
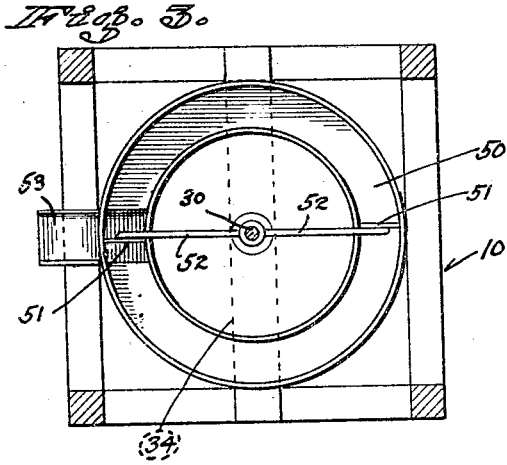
Inventor
HIRAM H. HILL
By
Attorneys Oct. 23, 1928.
H. H. HILL
1,688,966
NUT CRACKING MACHINE
Filed June 21, 1926    2 Sheets-Sheet 2
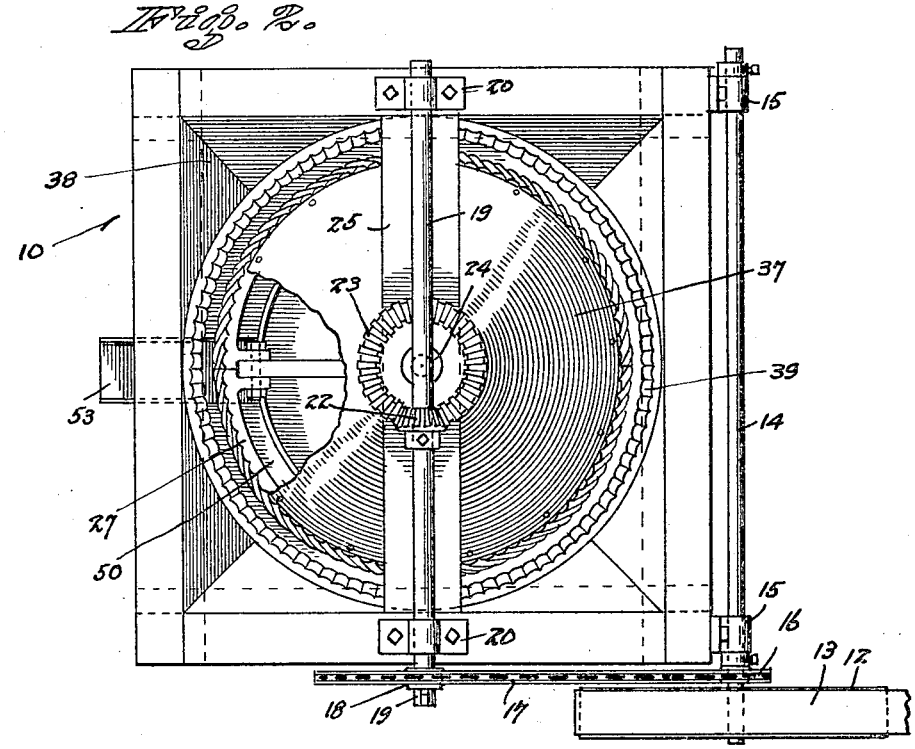
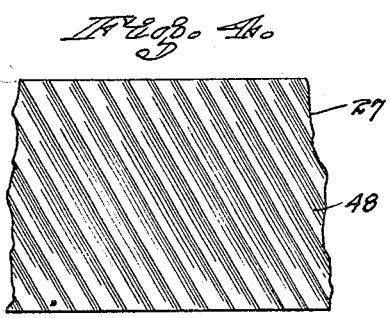
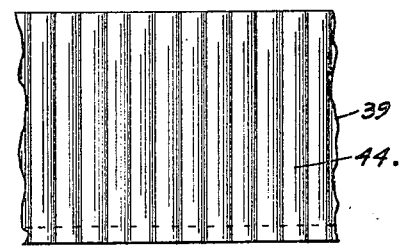
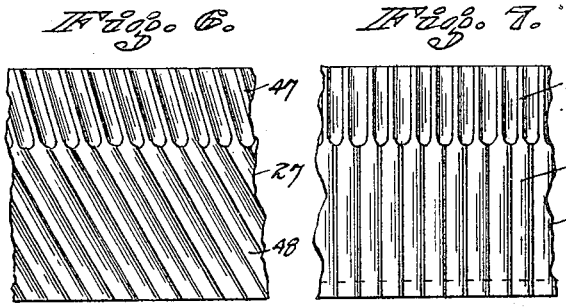
Inventor
HIRAM H. HILL
Attorneys Patented Oct. 23, 1928.

1,688,966

UNITED STATES PATENT OFFICE.

HIRAM H. HILL, OF CHICO, CALIFORNIA.

NUT-CRACKING MACHINE.

Application filed June 21, 1926. Serial No. 117,450.

This invention relates to nut cracking machines and it has for one of its objects the provision of a nut cracking machine which will effectually crack the shells of the nuts and separate the shells from the meats without effecting or breaking the meats.

With the foregoing object in view, together with such other objects and advantages as may subsequently appear, this invention resides in the construction and arrangement of parts hereinafter described and claimed, and illustrated in the accompanying drawings, in which Figure 1 is an elevational view of my nut cracking machine, partly broken away and partly in section.

Figure 2 is a plan view of Figure 1.

Figure 3 is a horizontal section taken on line 3—3 of Figure 1.

Figures 4 to 7 inclusive are plan views of corrugated plates employed in the nut cracking machine.

Referring to the drawings for more detailed description thereof, the numeral 10 indicates the frame of the machine. To one side, and adjacent the top of the frame, is disposed a pulley 12 adapted to be rotated by a belt 13. The pulley 12 is mounted on a rotatable shaft 14 journaled in brackets 15 secured to one side of the frame adjacent the top thereof, as clearly shown in Figure 2.

A sprocket wheel 16 is fixedly mounted on the shaft 14 adjacent the pulley 12. The sprocket wheel 16 is engaged by a chain 17, which engages a larger sprocket wheel 18 fixedly mounted on a shaft 19 which is journaled in bracket 20 fixed to the tops of opposing sides of the frame. The shaft 19 carries a bevelled pinion 22 fixed thereon, as shown in Figure 2.

The pinion 22 meshes with a horizontally disposed bevelled gear 23 which is fixedly mounted at the upper end of a shaft 24, which passes through a holding member 25 secured to the upper portions of opposite sides of the frame, as shown in Figure 2.

The shaft, 24, as shown in Figure 1, is vertical and passes centrally through a nut cracking member 27 and is adapted to rotate the latter. The lower end of the shaft 24 threadedly engages a member 28 which supports the member 27. According to the setting of the member 28 on the shaft 24, the cracking member 27 may be raised or lowered. In alinement with the shaft 24, a shaft 30 is connected with the shaft 24, or forms an extension thereof, and is adapted to be rotated thereby. The shaft 30 has at its bottom a disk 31 which rides on ball bearings 32, the disk 31 and the bearings 32 being enclosed in a member 33 which rests on an element 34.

It will be noted that the cracking member 27 has a top 37 which inclines downwardly from its center. The top is so inclined so that nuts falling thereon from a hopper 38, shown in Figure 2, may gravitate from the top of the grinding member 27 to the space between the latter and a second cracking member 39 which encircles it concentrically, as shown in Figures 1 and 2. The cracking members 27 and 39 cooperate to crack the shells of the nuts and to separate the shells from the meats.

The cracking member 39 is stationary and is tapered, with its small end down, and is fixedly supported to a support 40 by fastening means 41. The cracking member 39, as shown in Figures 1 and 5, has a corrugated inner surface comprising straight parallel convex spaced ribs. However, the corrugated surface of the member 39 may be as shown in Figure 7, wherein the lower part of the cracking surface is as shown in Figures 1 and 5, whereas the upper part is provided with ribs 43 which are sharper than the ribs 44 of the lower part of the corrugated surface.

The corrugations on the outside of the inner cracking member, as shown in Figures 1 and 2, are spirally arranged on the side of the mentioned member. The corrugated surface comprises parallel convex spaced ribs, and they may be placed at such an angle that the meats of the nuts will be retained in the grooves between the ribs at a critical speed of the inner rotating cracking member 37.

It will thus be seen that the angle at which the spiral corrugations are set should be varied for different speeds of rotation of the cracking member 37. Instead of the spiral surface shown on the outside of the inner cracking member 37, the surface shown in Figure 6 may be employed, wherein the upper portion of the cracking surface comprises ribs 47 on the upper portion of the surface which are sharper than the ribs 48 on the lower portion of the surface. The ribs 47 are set at an angle to the ribs 48.

The spiral corrugated surface of the inner rotating member causes a forced feed and functions to retain the meats between the ribs so that they do not pass across the ribs and are therefore not injured and remain whole. The meats fall through the grooves of the spiral corrugations into the annular trough 50, shown in Figure 3, from which they are swept out by revolving vertical brushes 51 secured to the ends of a bar 52, which is secured to the shaft 30 and rotated thereby. The shells also drop into the annular trough 50 and are likewise swept out of such trough by the brushes 51.

An inclined chute 53 is provided, as shown in Figure 3, through which the meats and shells may fall, and they may then be taken up for further treatment.

I claim:

In a device of the type described, a cylindrical nut cracking member having grooves on the exterior surface thereof, each groove extending from the top to the bottom of said member, a second cylindrical member enclosing said first named member and having grooves on the interior surface thereof, the grooves of at least one of said members slanting so as to cause each groove to extend less than one-fourth of the way around the circumference of the member.

HIRAM H. HILL.